(12) United States Patent
Frix

(10) Patent No.: US 10,869,164 B2
(45) Date of Patent: Dec. 15, 2020

(54) ATHLETE ATTEND CLASS MONITORING SYSTEM

(71) Applicant: James Tyler Frix, Calhoun, GA (US)

(72) Inventor: James Tyler Frix, Calhoun, GA (US)

( * ) Notice: Subject to any disclaimer, the term of this patent is extended or adjusted under 35 U.S.C. 154(b) by 239 days.

(21) Appl. No.: 16/181,488

(22) Filed: Nov. 6, 2018

(65) Prior Publication Data

US 2019/0086551 A1 Mar. 21, 2019

Related U.S. Application Data

(63) Continuation of application No. 14/752,563, filed on Jun. 26, 2015, now Pat. No. 10,145,957.

(60) Provisional application No. 62/020,176, filed on Jul. 2, 2014.

(51) Int. Cl.
*H04W 4/029* (2018.01)
*G06Q 10/06* (2012.01)
*H04W 4/021* (2018.01)

(52) U.S. Cl.
CPC .... *H04W 4/029* (2018.02); *G06Q 10/063114* (2013.01); *H04W 4/021* (2013.01); *G06F 2221/2111* (2013.01)

(58) Field of Classification Search
CPC ....... H04W 4/02; H04W 4/021; H04W 4/029; H04W 4/04; H04W 4/30; H04W 4/38; H04W 4/70; H04W 64/00; H04W 84/00; H04W 84/005; H04W 88/00; H04W 88/005; H04W 88/08; G06Q 10/00; G06Q 10/06; G06Q 10/063; G06Q 10/0631; G06Q 10/063114; G01S 5/0009; G01S 5/0018; G01S 5/0027; G01S 19/13; G06F 2221/2111
See application file for complete search history.

(56) References Cited

U.S. PATENT DOCUMENTS

2006/0255935 A1\* 11/2006 Scalisi .................. G01S 5/0027
340/539.13

\* cited by examiner

*Primary Examiner* — Cheung Lee
(74) *Attorney, Agent, or Firm* — Matthew T. Hoots

(57) ABSTRACT

A system and method for monitoring and verifying athlete attendance in a classroom is disclosed. An exemplary embodiment defines a GPS-based fence in association with a classroom as well as defines a class start time and a class end time. GPS coordinates associated with a portable computing device ("PCD") associated with a given athlete are received and determined to be within a range of coordinates associated with the fence. Also, a time associated with the receiving of the GPS coordinates is determined to be within a window of time comprising the class start time. Subsequently, a picture of a user is captured with a camera of the PCD. Next, from the picture the user is verified to be the given athlete. Finally, the given athlete is marked as "present" within the class.

20 Claims, 2 Drawing Sheets

ATHLETE ATTEND CLASS MONITORING SYSTEM

BACKGROUND

Class attendance monitoring can be done in several ways. Athlete Attend focuses on remote monitoring through smart devices in order to insure that athletes do in fact attend class.

Class attendance has a proven positive correlation with graduation in collegiate athletes. The University of Georgia has seen extreme improvements in graduation rate by sport since class attendance monitoring was put into place in 2005. For instance, the football team's graduation rate improved from 41% to over 81%.

Class attendance monitoring, or class checking, is the act of ensuring that an athlete goes to class, shows up on time and remains for the duration of the class. This task is done by students hired by the athletic association and managed by the academic staff of the institution. The students stand outside of each classroom 15 minutes before class starts and remain 15 minutes into class. They have a clipboard with a sign in sheet that each student-athlete must sign as he/she enters the classroom. If a student is late or leaves early, the class checker may make a note of how late the student-athlete was or when he/she left. At the end of the class or when the class checker's duties are complete for a given class the checker logs into the student-athlete academic website and plugs in the attendance.

It is the class checker's responsibility to keep up with each day's sign in sheet and then turn them in every 2 weeks in order to be paid.

This system brings up several issues. First and foremost, class checkers are paid for a full hour for only 30 minutes of actual work. But that is just the start of the problems. The athletes and class checkers both find ways around the system such as, for example:
  a. Athletes leave after the checker leaves
  b. Athletes sign each other into class
  c. Athletes arrive before the checker and then are marked absent
  d. Checkers do not go to class and just mark every athlete as present
  e. Checkers never mark star players absent
  f. Checkers make deals with the athletes Another major problem is the punishment for missing a class. Student-athletes are suspended from competition if they miss a certain number of classes. But academic staff have a very hard time bringing the punishment to fruition because coaches never trust the checkers. They always believe the athlete. Unfortunately athletes are not always trust worthy so there is a constant battle between the academic staff and the coaching staff.

The problem is with the evidence, or lack thereof. There are so many ways around the system that it is extremely hard for the academic staff to prove an athlete's lack of attendance. The athletes know this and use it to their advantage. While graduation rates have improved dramatically, by solving this issue the rates can be improved even further.

BRIEF SUMMARY

The presently disclosed embodiments, as well as features and aspects thereof, are directed towards a system and method for automating and verifying the class checker process. By removing the class checkers from the equation, the human factor is cut in half leaving only the athletes. To do this the GPS on smart devices may be used. A GPS fence may be created that encircles each class room and GPS tracking may be enacted inside that fence. This may enable the academic staff to know the exact time that an athlete walks into and leaves a classroom.

BRIEF DESCRIPTION OF THE SEVERAL VIEWS OF THE DRAWING

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
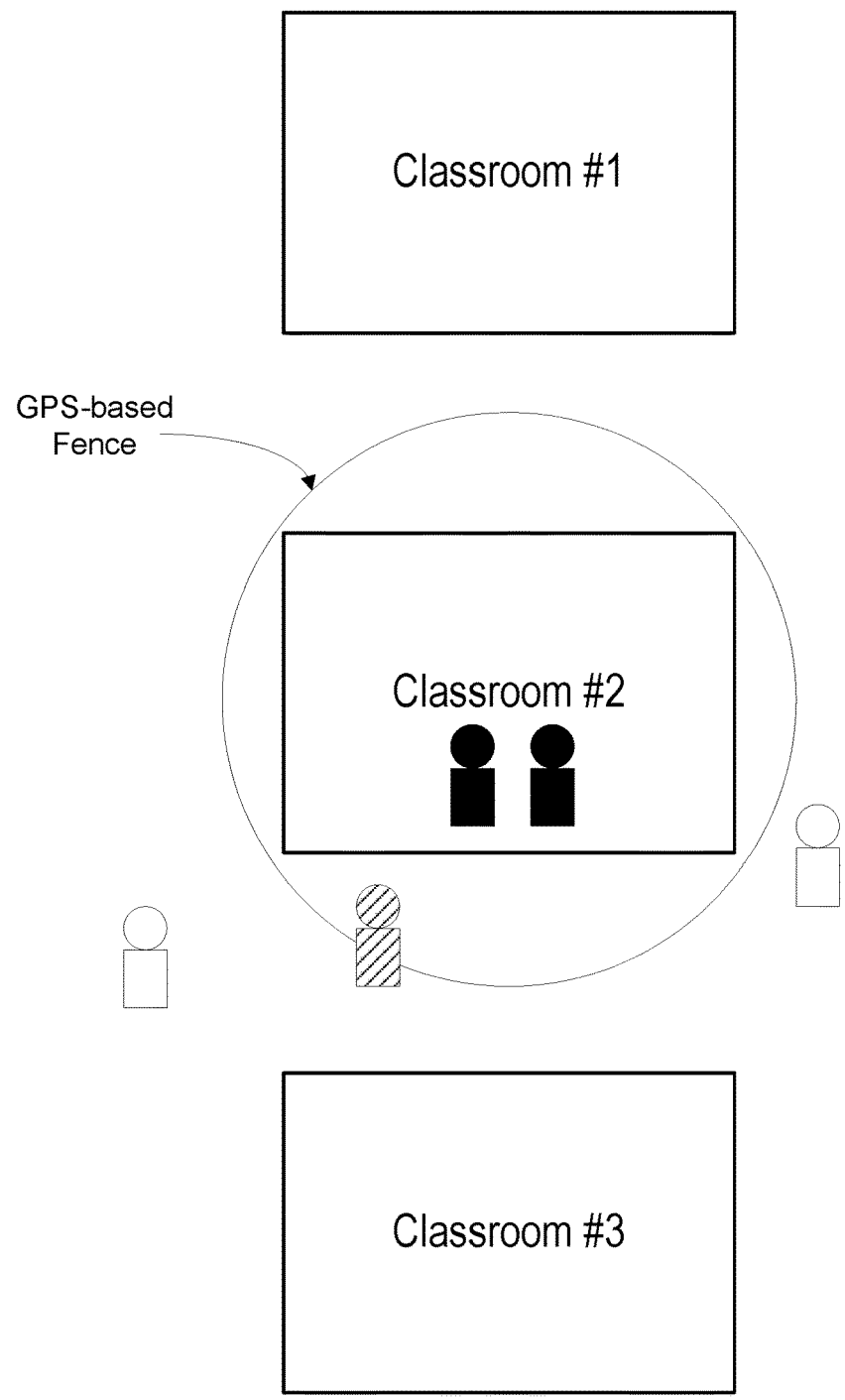
FIG. 1 is a functional block diagram depicting a classroom that has been associated with a GPS-based fence.
Figure 1:
Figure 1:
Figure 1:

Aspects, features and advantages of several exemplary embodiments of the present invention may become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms such as, for example, "may," "may not," "shall," "shall not," "must" and "must not" are not meant to limit the scope of the present invention as the embodiments disclosed herein are merely exemplary.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content," as referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

The presently disclosed embodiments, as well as features and aspects thereof, are directed towards providing a system and method for automating and verifying the class checker process. In order to accomplish this task, it is envisioned that every classroom may be tagged with a GPS coordinate. This coordinate may be used to create a "Fence" around the classroom as shown in FIG. 1. Athletes within the fence may be tagged as in class, and athletes outside the fence may be given a certain amount of time to show up late before being marked absent. Certain athletes may be designated as being in the null state. The null state is triggered when an athlete enters class with a smart device but that device goes dead during class. If this happens the Athlete Attend system may not be able to track when the athlete leaves class. For this reason that athlete may not be marked as present. Instead the athlete may have to explain to his/her counselor why they were marked as a null state and it may be up to the counselor to mark the athlete as present or absent.

Figure 2:
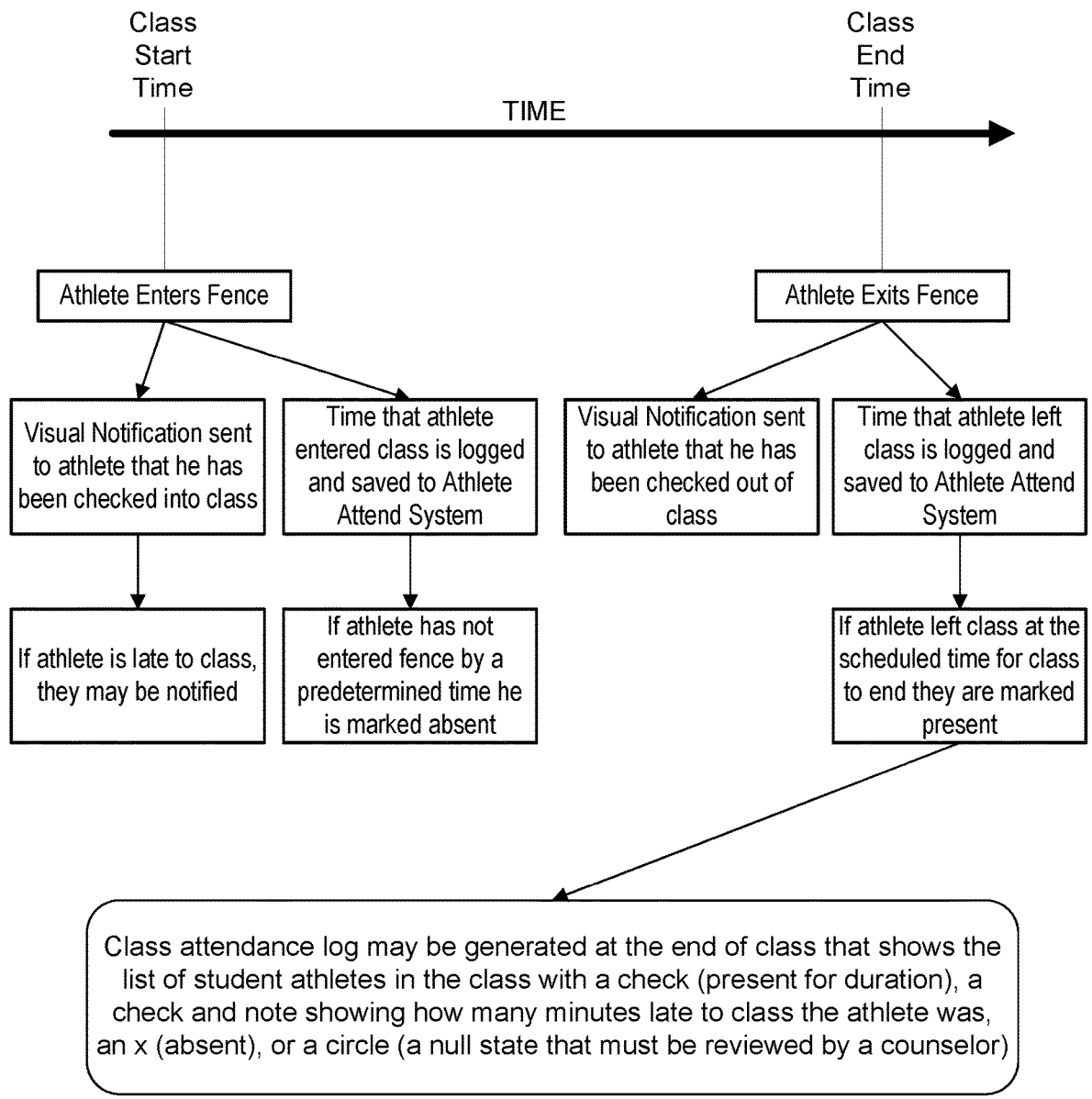
FIG. 2 is a flow chart illustrating an exemplary method for monitoring and verifying athlete attendance in a class.

When an athlete's smart device is brought into the fence a series of events may be triggered as shown in FIG. 2. These events may ultimately determine if the athlete is marked as present, absent, or given a null state. The application may be able to track the students within the GPS fence in order to ensure that a single student-athlete is not carrying multiple smart devices. The application may also be able to check proximity in the x, y and z axis to other smart devices in order to determine elevation and any other pertinent information.

The class attendance log that is generated may be viewable instantaneously by the academic staff and any administrators from the central system online or from an application on the user's smart device. The athlete may also be able to view his/her personal attendance log at the end of class from his/her smart device. This may take out any guessing on the athlete's part as to if they were marked as present or absent, or given a null state.

In the event that the student-athlete does not have a smart phone, a teammate can check them into class utilizing the "teammate check-in" option on their smart device. This may be a small button located at the top of the application that when clicked on by a student athlete inside a GPS fence may show the list of student-athletes in the class. The user may then select the teammate they would like to check in from that list. Once the teammate is selected, the camera may open and allow a picture to be taken of the teammate. This picture may be instantly sent to an academic counselor for approval. This may keep athletes from checking in the wrong person. The athlete in question may be given a null state until a counselor either approves or disproves the picture submittal.

In order to help combat the divide between academic staff and coaches, daily or weekly attendance digest may be sent to the coaches' smart devices. These digests may track player attendance so that the coaches always know who is missing class and who is attending class. These digests may also include grade reports so that the coaches can keep up to date with their student-athletes academics.

This system may allow an integration of student-athletes, academic staff and coaches. It may cut out wasteful spending on employees and paper and may combat the constant back and forth between coaches and counselors. It may also keep the student athlete constantly informed as to their attendance in each of their classes. The below figures may outline the application being built and how each user (student-athlete, academic staff, and coach) may interact with it.

The student-athlete may be notified of upcoming class times on his smart device. The athlete may then have the option to click ok to open the application or simply open the application at his convienience. One the application has been opened, the days class calender may be shown along with a check for any classes that have been attended, an x for any classes missed and a dash for upcoming classes. The athlete may be able to click on any of the classes shown in order to see pertinant information regarding the class. This can include the athlete's current number of absences in the class as well as the professor's name, classroom number, time of class, and any important alerts. These alerts could be upcoming test dates or a simple reminder that if the athlete misses another class he/she may be suspended for an upcoming athletic event. The athlete may also have the option of seeing the calender in a month view by clicking on the calender button on the top of the screen. This may show the current month along with an x on any day where a class or any appointment was missed.

If the student-athlete needed to check a teammate or fellow athlete into a class because that athlete did not have a smart device that day then the first athlete would click on the camera at the top right side of the application. This would bring up a list of athletes that are enrolled in the same class. This feature may only work if the first athlete is within the GPS fence of that class. One the class list is pulled up the athlete may select the fellow athlete that needs to be checked in and then the camera may load. A picture may be taken of the athlete that needs to be checked in and that athlete may be given a null state of attendance. This picture may then be sent to the counselor for approval.

The academic staff may be responsible for managing all of the online software, but they may also have an application on their smart device that allows them to look up class attendance logs and receive notifications, as well as clear null states.

Coaches may be given in depth monitoring capabilities of their players. This is done to help alleviate the divide between coaches and academic staff by constantly keeping coaches in the know. Attendance digest may be sent straight to the coaches' smart devices either daily or weekly. When the coach clicks ok or opens the application the coach may see a breakdown of athletes by position (if the sport warrants it, as football does) and a notification above the mail icon in the upper left hand corner. When the coach clicks on the notification the application may display the players that had attendance issues that week. The coach may then be able to click on each respective player to see exactly what the issue was.

The coach may then go back to his home screen and select any segment unit on the team, in this case football, in order to see a list of athletes in that segment. For instance if the coach clicked on Defensive Backs then the list of Defensive Backs on the football team would populate. The names may have colors associated with them. These colors specify how close a player is to being suspended from an athletic activity because of class absences. Green means no absences in any class. Yellow means one absence in any class. Red means two absences in any class. These colors can be programmed for anything, but assuming a system where an athlete is suspended after three absences from any single class this system works well. It allows the coach to know which athletes he/she needs to stay on top of and if an athlete does miss enough classes to be suspended the coach may be prepared for that news.

A coach may then be able to click on any player's name in order to see a breakdown of classes that player is in and how many absences that player has in each class. This may be color coded in the same manner as the previous screen. This screen can also display any important alerts that the coach needs to be aware of, such as if that athlete misses one more math class he/she may be suspended from the next athletic event.

Coaches may also be able to click on any of the classes and get an in depth breakdown of the athlete's performance in that class including past grades and upcoming test dates.

Using our system we may also turn academic excellence into a game that rewards the athletes who comply. We may write an algorithm that weights attendance, tardiness, absences, seat position (whether the student-athlete sits in the front or back of the class), grades and any number of other metrics in order to give each athlete a personalized score. The athletes may use this score to compete against other athletes for prizes throughout the year.

Systems, devices and methods for the athlete attend class monitoring have been described using detailed descriptions of embodiments thereof that are provided by way of example and are not intended to limit the scope of the disclosure. The described embodiments comprise different features, not all of which are required in all embodiments of an athlete attend class monitoring method and system. Some embodiments of an athlete attend class monitoring methods and systems utilize only some of the features or possible combinations of the features. Variations of embodiments of an athlete attend class monitoring method and system that are described and embodiments of an athlete attend class monitoring method and system comprising different combinations of features noted in the described embodiments may occur to persons of the art.

It may be appreciated by persons skilled in the art that systems, devices and methods for the provision of an athlete attend class monitoring method and system is not limited by what has been particularly shown and described herein above. Rather, the scope of systems, devices and methods for the provision of an athlete attend class monitoring method and system is defined by the claims that follow.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it may be understood that various substitutions and alterations may be made therein without departing from the spirit and scope of the present invention, as defined by the following claims.

What is claimed is:

1. A method for monitoring and verifying user location relative to a defined geographic zone, the method comprising:
    defining a geographic zone based on a range of global positioning system ("GPS") coordinates;
    defining a time window comprising an attendance start time and an attendance end time;
    receiving, within the time window, GPS coordinate signals from one or more portable computing devices ("PCD"), each of the one or more PCDs uniquely associated with a user;
    recognizing a first GPS coordinate signal from the received GPS coordinate signals, wherein:
        the first GPS coordinate signal is associated with a first PCD that is associated with a first user,
        the first user is associated with a target group of users, and
        the first GPS coordinate signal indicates that the first PCD is within the geographic zone;
    recognizing a second GPS coordinate signal from the received GPS coordinate signals, wherein:
        the second GPS coordinate signal is associated with a second PCD that is associated with a second user,
        the second user is associated with the target group of users, and
        the second GPS coordinate signal indicates that the second PCD is outside the geographic zone;
    in response to determining that the second PCD is outside the geographic zone, tracking the second PCD; and
    updating a user attendance log associated with the defined geographic zone and time window such that the first user associated with the first PCD is marked in attendance and the second user associated with the second PCD is marked absent.

2. The method of claim 1, wherein the geographic zone is associated with one of a classroom, a medical facility, a retirement community, and a personal dwelling.

3. The method of claim 1, wherein tracking the second PCD comprises:
    recognizing that the second PCD is within a certain proximity to one of a plurality of checkpoints associated with the geographic zone.

4. The method of claim 1, further comprising:
    waiting a predetermined amount of time before determining that the second PCD is outside the geographic zone.

5. The method of claim 1, wherein updating the user attendance log comprises capturing digital images of one or more users associated with the target group of users.

6. The method of claim 1, further comprising:
    recognizing a third GPS coordinate signal from the received GPS coordinate signals, wherein:
        the third GPS coordinate signal is associated with a third PCD that is associated with a third user,
        the third user is associated with a target group of users, and
        the third GPS coordinate signal indicates that the third PCD is within the geographic zone;
    comparing the first GPS coordinate signal to the third GPS coordinate signal to determine a proximity of the first PCD to the third PCD; and
    based on the proximity of the first PCD to the third PCD, updating the attendance log associated with the defined geographic zone and time window.

7. The method of claim 1, wherein the one or more PCDs are in the form of one of a smartphone and a wrist mounted device.

8. A system for monitoring and verifying user location relative to a defined geographic zone, the system comprising:
    a server in remote communication with a plurality of portable computing devices ("PCDs"), the server configured to:
        define a geographic zone based on a range of global positioning system ("GPS") coordinates;
        define a time window comprising an attendance start time and an attendance end time;
        receive, within the time window, GPS coordinate signals from one or more PCDs, each of the one or more PCDs uniquely associated with a user;
        recognize a first GPS coordinate signal from the received GPS coordinate signals, wherein:
            the first GPS coordinate signal is associated with a first PCD that is associated with a first user,
            the first user is associated with a target group of users, and
            the first GPS coordinate signal indicates that the first PCD is within the geographic zone;
        recognize a second GPS coordinate signal from the received GPS coordinate signals, wherein:
            the second GPS coordinate signal is associated with a second PCD that is associated with a second user,
            the second user is associated with the target group of users, and
            the second GPS coordinate signal indicates that the second PCD is outside the geographic zone;
        in response to determining that the second PCD is outside the geographic zone, track the second PCD; and
        update a user attendance log associated with the defined geographic zone and time window such that the first user associated with the first PCD is marked in attendance and the second user associated with the second PCD is marked absent.

9. The system of claim 8, wherein the geographic zone is associated with one of a classroom, a medical facility, a retirement community, and a personal dwelling.

10. The system of claim 8, wherein tracking the second PCD comprises:
    recognizing that the second PCD is within a certain proximity to one of a plurality of checkpoints associated with the geographic zone.

11. The system of claim 8, further comprising:
    wait a predetermined amount of time before determining that the second PCD is outside the geographic zone.

12. The system of claim 8, wherein updating the user attendance log comprises capturing digital images of one or more users associated with the target group of users.

13. The system of claim 8, wherein the server is further configured to:
    recognize a third GPS coordinate signal from the received GPS coordinate signals, wherein:
        the third GPS coordinate signal is associated with a third PCD that is associated with a third user,
        the third user is associated with a target group of users, and
        the third GPS coordinate signal indicates that the third PCD is within the geographic zone;

compare the first GPS coordinate signal to the third GPS coordinate signal to determine a proximity of the first PCD to the third PCD; and based on the proximity of the first PCD to the third PCD, update the attendance log associated with the defined geographic zone and time window.

14. The system of claim 8, wherein the plurality of PCDs is in the form of one of a smartphone and a wrist mounted device.

15. A computer program product comprising a computer-readable medium having a computer readable program code embodied therein, said computer readable program code adapted to be executed to implement a method for monitoring and verifying user location relative to a defined geographic zone, said method comprising:

defining a geographic zone based on a range of global positioning system ("GPS") coordinates;
  defining a time window comprising an attendance start time and an attendance end time;
  receiving, within the time window, GPS coordinate signals from one or more portable computing devices ("PCD"), each of the one or more PCDs uniquely associated with a user;
  recognizing a first GPS coordinate signal from the received GPS coordinate signals, wherein:
    the first GPS coordinate signal is associated with a first PCD that is associated with a first user,
    the first user is associated with a target group of users, and
    the first GPS coordinate signal indicates that the first PCD is within the geographic zone;
  recognizing a second GPS coordinate signal from the received GPS coordinate signals, wherein:
    the second GPS coordinate signal is associated with a second PCD that is associated with a second user,
    the second user is associated with the target group of users, and
    the second GPS coordinate signal indicates that the second PCD is outside the geographic zone;
  in response to determining that the second PCD is outside the geographic zone, tracking the second PCD; and
  updating a user attendance log associated with the defined geographic zone and time window such that the first user associated with the first PCD is marked in attendance and the second user associated with the second PCD is marked absent.

16. The computer program product of claim 15, wherein the geographic zone is associated with one of a classroom, a medical facility, a retirement community, and a personal dwelling.

17. The computer program product of claim 15, wherein tracking the second PCD comprises:
  recognizing that the second PCD is within a certain proximity to one of a plurality of checkpoints associated with the geographic zone.

18. The computer program product of claim 15, further comprising:
  waiting a predetermined amount of time before determining that the second PCD is outside the geographic zone.

19. The computer program product of claim 15, wherein updating the user attendance log comprises capturing digital images of one or more users associated with the target group of users.

20. The computer program product of claim 15, further comprising:
  recognizing a third GPS coordinate signal from the received GPS coordinate signals, wherein:
    the third GPS coordinate signal is associated with a third PCD that is associated with a third user,
    the third user is associated with a target group of users, and
    the third GPS coordinate signal indicates that the third PCD is within the geographic zone;
  comparing the first GPS coordinate signal to the third GPS coordinate signal to determine a proximity of the first PCD to the third PCD; and
  based on the proximity of the first PCD to the third PCD, updating the attendance log associated with the defined geographic zone and time window.

* * * * *